United States Patent
Aldrovandi

Patent Number: 5,833,268
Date of Patent: Nov. 10, 1998

[54] COUNTERWEIGHT HOISTING MECHANISM

[76] Inventor: Louis Aldrovandi, 7135 Islington Ave., Woodbridge, Ontario, Canada, L4L 1V9

[21] Appl. No.: 761,497

[22] Filed: Dec. 6, 1996

[51] Int. Cl.⁶ ................................................... B60R 11/00
[52] U.S. Cl. ........................ 280/759; 212/178; 212/195; 414/719
[58] Field of Search ................................... 212/178, 195; 280/759; 414/719

[56] References Cited

U.S. PATENT DOCUMENTS

| | | | |
|---|---|---|---|
| 3,135,404 | 6/1964 | Pilch | 212/178 |
| 3,902,735 | 9/1975 | Bertram et al. | 280/759 |
| 3,924,753 | 12/1975 | Lamer et al. | 212/178 |
| 4,081,081 | 3/1978 | Morrow et al. | 212/195 |
| 4,090,579 | 5/1978 | Stedman | 280/759 |
| 4,196,816 | 4/1980 | Dvorsky et al. | 212/195 |
| 4,659,102 | 4/1987 | Stuhrmann et al. | 280/759 |
| 5,141,195 | 8/1992 | Toda et al. | 212/178 |
| 5,199,583 | 4/1993 | Weider et al. | 212/195 |
| 5,598,935 | 2/1997 | Harrison et al. | 212/178 |

Primary Examiner—Thomas J. Brahan

[57] ABSTRACT

The invention provides a self-mounting counterweight device which is mounted to one end of the chassis frame of the vehicle. The counterweight is U-shaped having two vertical sides and an outward wall defining an internal enclosure. The counterweight includes a rod mounted to the top of the counterweight for suspending it from a boom and includes lateral threaded bolts to releasably mount the counterweight to blocks on the chassis frame. The lifting boom has an inward end journalled to the frame and an outward end with tackle for releasably connecting the boom outward end to the counterweight suspending rod. A hydraulic cylinder provides mechanical lift with an inward end journalled to the frame and an outward end pivotally connected to the boom. The combination of the boom and lift provides a scissor-like lever for selectively raising and lowering the counterweight between a lowered and mounted position. In the lowered position, the boom and counterweight are extended outwardly to hoist the counterweight on an adjacent ground surface. In the mounted position, the boom and hydraulic cylinder fold or nest within the internal enclosure of the U-shaped counterweight. In the mounted position therefore, the hydraulic cylinder and boom are axially bounded by the vehicle frame and counterweight rear wall and laterally bounded by the counterweight side wall. Damage to the boom and hydraulic cylinder with attached hydraulic hoses etc. is minimized by surrounding the relatively delicate bearings and shaft of the boom, hydraulic cylinder and hose fittings within a thick-walled steel plate enclosure of the U-shaped counterweight and chassis frame.

9 Claims, 6 Drawing Sheets

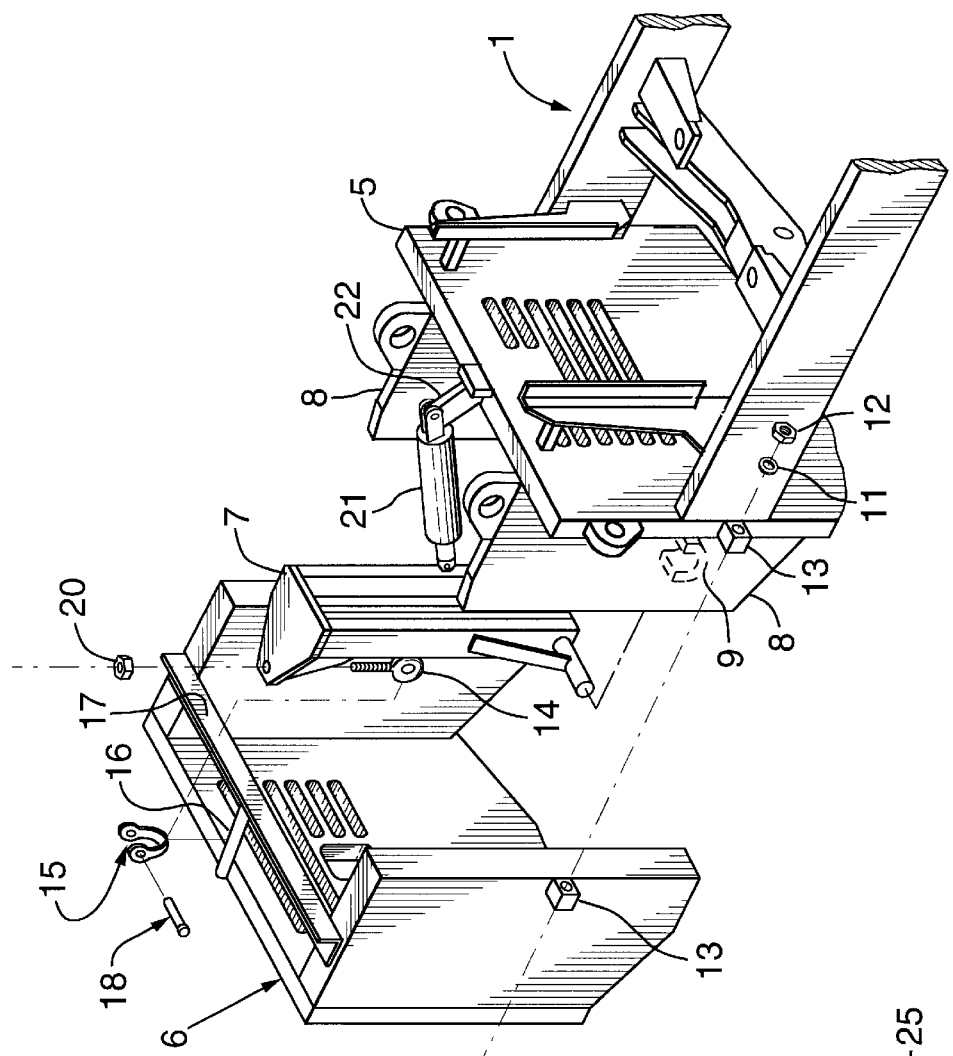
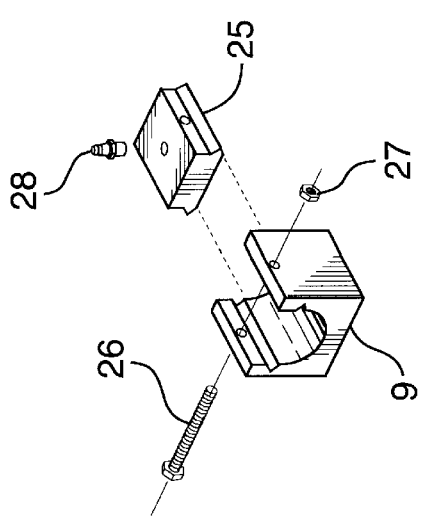
FIG.1
FIG.2

COUNTERWEIGHT HOISTING MECHANISM

TECHNICAL FIELD

The invention is directed to a counterweight mounting device for vehicles which require periodic removal and remounting of the counterweight in order to reduce the shipping weight of the vehicle.

BACKGROUND OF THE ART

Various types of lifting equipment require the use of counterweights to balance the effects of loading. For example, fork lift trucks, front end loaders, mobile cranes, and backhoes all include substantial counterweights on the rear end of the vehicle to counteract the weight of loads lifted by the front end of the vehicle. It will be understood that the invention can be applied to any such piece of equipment, however, for simplicity the description herein and accompanying drawings use a forklift truck as an illustrative example.

In general, a counterweight comprises a single metal block or array of cast metal blocks since use of high density materials results in minimal size. Large size vehicles, such as heavy lift forklifts, are often shipped from place to place on flatbed truck trailers or railway cars for ease of shipping or since they exceed the size and weight regulations for safe highway traffic.

The mass of the counterweights of such high capacity machines can be substantial. In order to reduce or redistribute the vehicle's weight, and in particular the concentrated axle loads, it is common to separate the vehicle and the counterweight during shipping. The counterweight is shipped separately or is placed on the flatbed away from the vehicle to distribute the total loading more evenly. When the vehicle is unloaded, the counterweight and vehicle are reunited to prepare the vehicle for operation.

Counterweights are commonly removed by: first supporting the counterweight with a separate lifting device, such as a crane, or another forklift; then removing bolts or other means which secure the counterweight to the vehicle; lowering the counterweight from engagement with the vehicle and transporting separately. The counterweight is remounted by reversing the operation.

If the removal of a counterweight is an operation which is seldom required, the conventional method described above is simple and satisfactory in most cases. However, in some cases the counterweight must be quickly or frequently removed and the conventional method is a cumbersome labour intensive time consuming operation.

Military vehicles present one such special case. To load and unload military transport airplanes, trucks, ships and railcars, heavy capacity rough terrain military forklift trucks are often used. For example, forklifts are used to load and unload large shipping containers of supplies, heavy loads of explosive materials, and military armaments. Due to unpredictable rough terrain, sensitive nature of explosives, and speed of operations, military forklift trucks are specified at lift capacities which far exceed the civilian safety factors commonly accepted.

In particular, military forklift specifications also require rapid removal and remounting of the counterweight. Military transport aircraft carry all manner of cargo, including containers, palletized loads and equipment which are adapted for handling with forklift trucks. A forklift truck accompanies the cargo in the aircraft cargo bay during air transport. When the plane lands, the forklift is used to unload or load the aircraft.

The concentrated axle loads of heavy capacity forklifts often exceeds the maximum specified for aircraft frame cargo bay structures. To reduce the axle loads to acceptable levels, the removal of the counterweight and time involved is specified in military equipment specifications. For example, the counterweight must be capable of being removed quickly with only the use of common hand tools by no more than two persons within no more than one hour. Specifications may limit removal and remounting time for the counterweight to as little as fifteen to thirty minutes maximum.

Conventional responses to this military specification include constructing the counterweight from an array of small castings or plate members secured to the vehicle frame. Each counterweight plate member is lightweight enough to be easily handled by manual labour, specified at 70 pounds maximum. Counterweight removal involves stacking the plates on a pallet or in a container box for shipping.

This conventional solution has several disadvantages. The plates must be manually handled exposing soldiers to the risk of physical injury if the plates are dropped or improperly stacked. As in any industrial activity, manual handling of heavy objects can result in back, shoulder or wrist injuries. The operation requires valuable time and labour both of which are often in short supply during military operations.

In addition, the use of an array of plates increases the possibility of loss or damage to the counterweights, as well as increasing the noise of operation as the small plates rattle.

It is desirable therefore to produce a means to mount and dismount the counterweight quickly and simply with minimal tools and minimal labour requirements. It is also particularly desirable to reduce or eliminate the manual labour involved in handling the counterweight to minimize risk of injury to operators and the time taken to complete the operation.

DISCLOSURE OF THE INVENTION

The invention provides a counterweight mounting device, for a vehicle having a chassis frame and powering means, the device comprising: a boom journaled to an end of the frame; a counterweight releasably mounted to said end; connecting means for releasably connecting the boom and counterweight and lift means for selectively raising and lowering the counterweight between a mounted position and a lowered position. Preferably, the counterweight is mounted rearward of the boom and houses the boom in a protective housing enclosure within the counterweight. The boom is actuated with an hydraulic cylinder powered by the vehicle's hydraulic system and is releasably connected to the counterweight with a shackle.

The invention addresses the disadvantages of the prior art by providing a counterweight mounting device which can be operated by a single machine operator. With simple hand tools the operator can release a monolithic counterweight from the vehicle frame. The counterweight is at all times suspended from a boom mounted on the vehicle. The boom is hydraulically actuated to lower and raise the counterweight under the existing power of the vehicle's hydraulic system. The boom is mounted advantageously within the U-shaped counterweight to protect the boom from accidental damage during operation. The boom, counterweight and hydraulic actuating cylinder fold up and nest compactly together mounted on the rear end of the forklift truck. The monolithic counterweight is secured safely to the vehicle frame during normal operation with simple bolts which are easily removed to lower the counterweight with the hydraulic boom. The tip of the boom includes means to suspend the counterweight, such as an adjustable eyelet bolt and removable shackle, enabling the load of the counterweight to be accurately centered and positioned as desired.

The invention then provides a compact self contained device which folds up within the confines of the counterweight. The device is easily used by a single operator significantly reducing the labour and time involved in handling the counterweight. The operator is not exposed to significant risk of physical injury.

Further details of the invention and its advantages will be apparent from the detailed description and drawings included below.

BRIEF DESCRIPTION OF THE DRAWINGS

In order that the invention may be readily understood, a preferred embodiment of the invention will be described by way of example, with reference to the accompanying drawings wherein:

FIG. 1 is an exploded isometric view of the counterweight, boom with actuating hydraulic cylinder and rear end of the vehicle chassis;

FIG. 2 is a detail exploded isometric view of the trunnion saddle bearing which supports the boom on the lateral gussets extending from the rear end of the chassis;

DETAILED DESCRIPTION OF PREFERRED EMBODIMENTS

It will be understood that the invention can be applied to any lifting equipment, however, for simplicity the description herein and accompanying drawings use a military forklift truck as an illustrative example.

Figure 3:
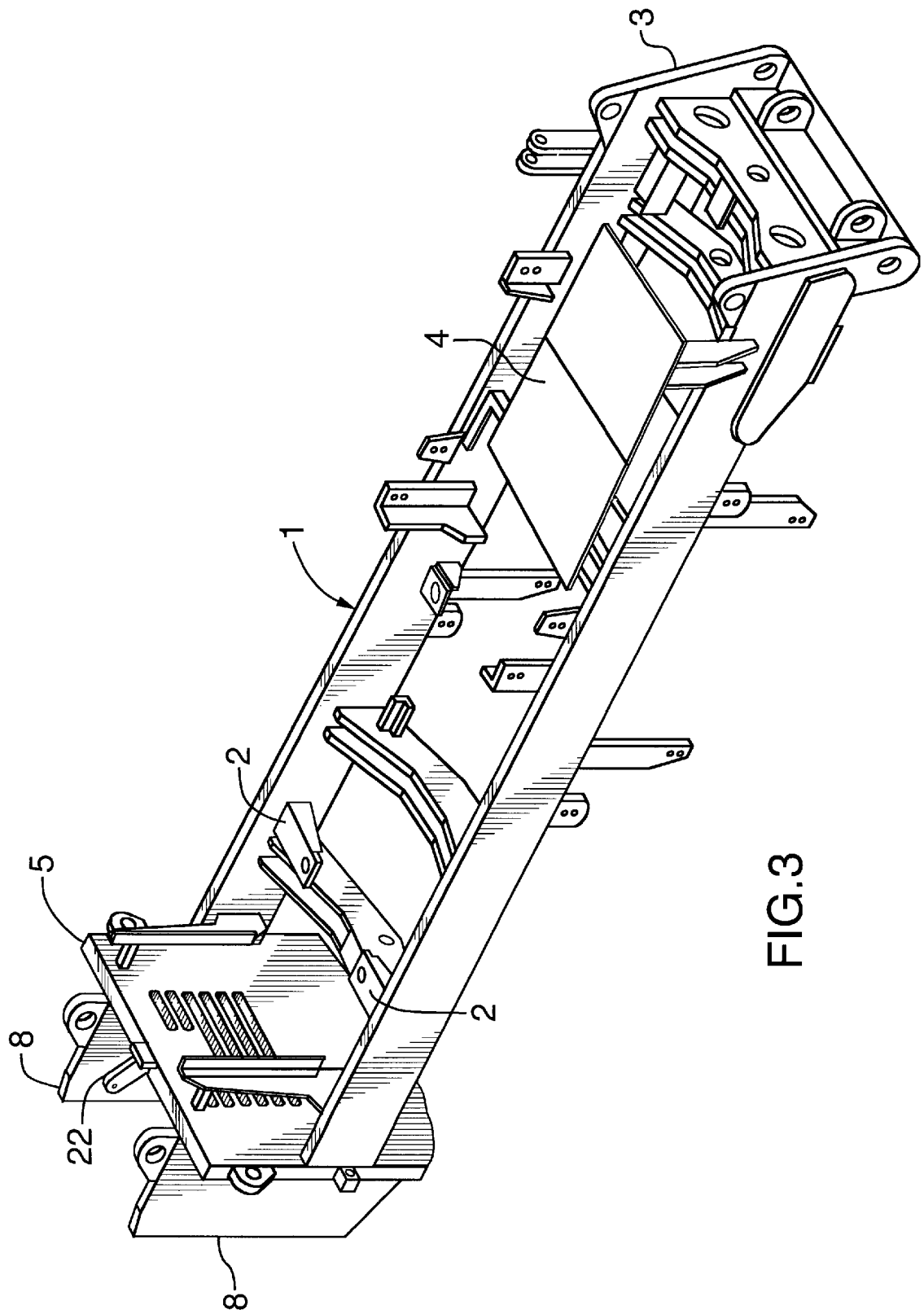
FIG. 3 is an exploded view of the vehicle chassis with boom and counterweight removed for clarity.

With reference to FIG. 1, the preferred embodiment of the invention comprises a counterweight mounting device, as illustrated, disposed on the rear end of a vehicle chassis frame 1. The chassis 1 is shown in further detail in FIG. 3 with rear engine mounts 2, front assembly 3 for attaching the forklift mechanism, and cab mount 4.

Of particular interest in respect of the invention is the rear end plate 5 of the chassis 1 to which the counterweight 6 and counterweight mounting device are attached. Two gusset plates 8 extend rearwardly from the rear end plate 5 and include opposing saddle bearing supports 9 (clearly shown in Fig.2).

As shown in FIG. 1, the device includes a boom 7 journaled to the rear end of the frame 1 in the saddles 9. The counterweight 6 is releasably mounted to the rear end plate 5 with removable bolts 10, washers 11 and nuts 12 through blocks 13 welded to the counterweight 6 and end plate 5.

To releasably connect the boom 7 and counterweight 6, connecting means are provided in the form of a threaded eyelet bolt 14, and shackle 15. The shackle 15 is releasably secured around the rod 16 and angle 17 support assembly of the counterweight 6. The removable clevis bolt 18 of the shackle 15 extends through the eyelet bolt 14. The threaded upper end of the eyelet bolt 14 extends through a cap plate 19 of the boom 7 and is secured with a nut 20 to provide fine adjustment to the suspended height of the counterweight 6 in operation.

Figure 4:
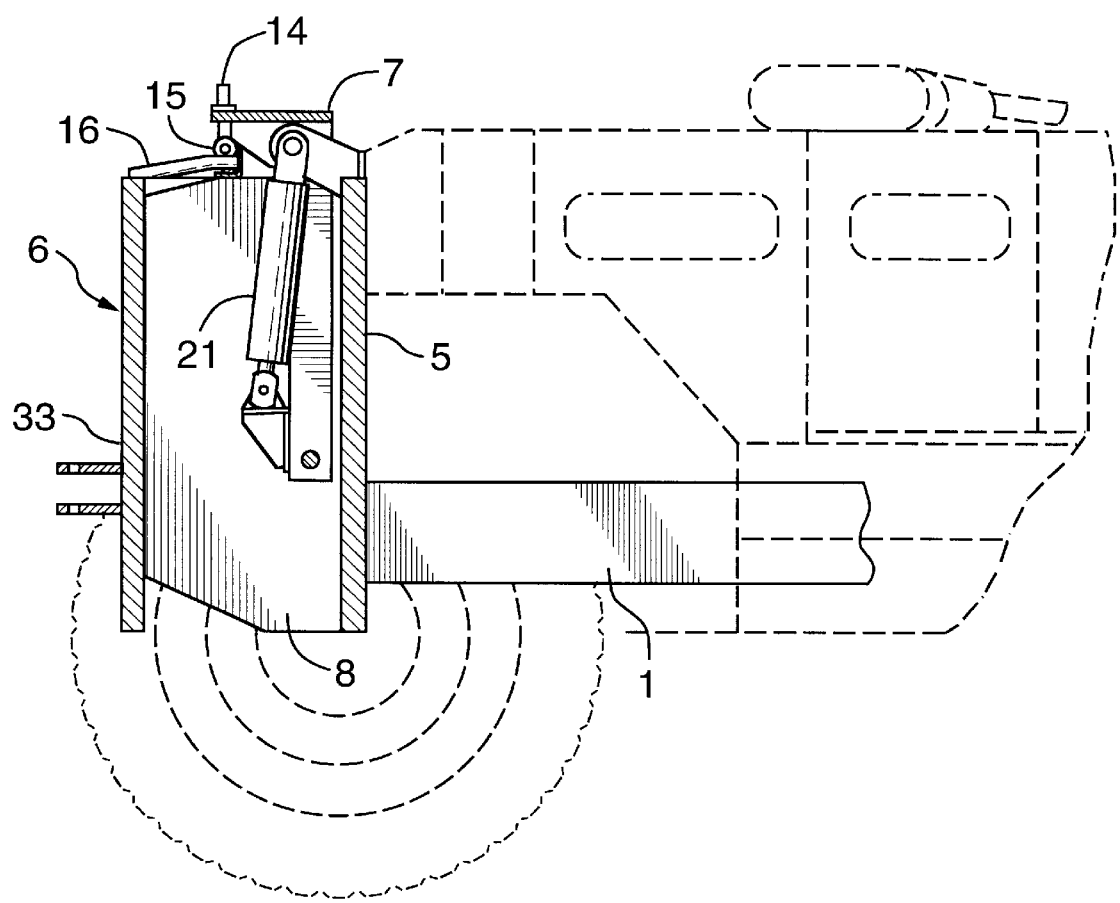
FIG. 4 is a sectional detail view of the boom and counterweight in the mounted position on the rear end of the vehicle chassis with the vehicle wheels and motor casing shown in dashed outline.
Figure 5:
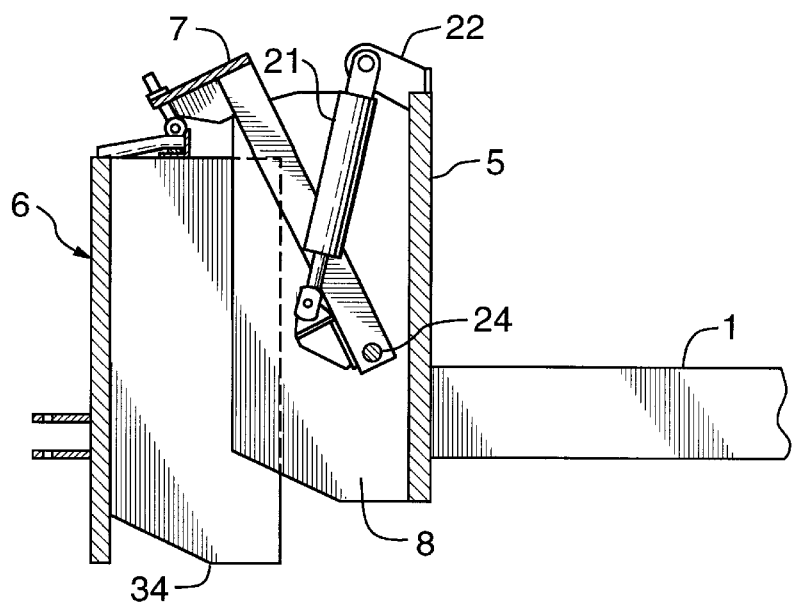
FIG. 5 is a sectional view like FIG. 4 but with the counterweight and boom in an intermediate position between the mounted and lowered positions.
Figure 6:
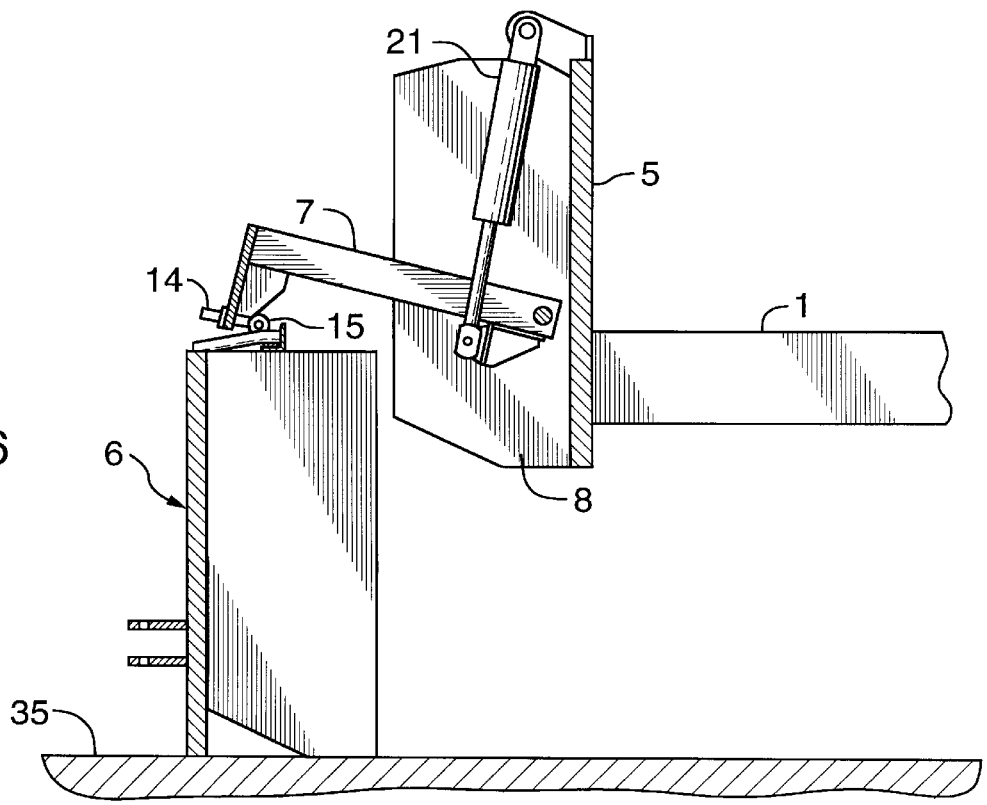
FIG. 6 is a like sectional view with the counterweight and boom in a lowered position with the counterweight resting on the ground surface while remaining connected to the boom with a releasable shackle through an eyelet bolt suspended from the boom.

An hydraulic cylinder 21 provides lift means to selectively raise and lower the counterweight 6 (as indicated in FIGS. 4, 5, and 6) between a mounted position (FIG. 4) and a lowered position (FIG. 6). The forward end of the hydraulic cylinder 21 is journaled in a bracket 22 welded to the top of the end plate 5. The rearward end of the hydraulic cylinder 21 is journaled to the boom 7, and actuates the boom 7 as will be described in detail below. Since most such vehicles have hydraulic systems powering various operations of the vehicle, it is a simple matter to also power the hydraulic cylinder 21 from the same system.

The counterweight 6 is preferably mounted rear of the boom 7 and is constructed with a forward facing pocket or housing. In the mounted position, the boom 7 is substantially enclosed or housed within this pocket. The result of this construction is that the device forms a compact unit in the mounted position which folds upon itself. In addition, the counterweight surrounds the boom 7 and hydraulic cylinder 21 protecting them from accidental damage. It is very common for the counterweight 6 mounted on the rear of the vehicle to be bumped during operation. The operator is usually located near the front of the vehicle in an enclosed cab and visibility toward the rear is limited. All controls including control valves for the operation of the boom 7 and hydraulic cylinder 21 are located in the cab. The counterweight 6 extends out from the frame 1 and is frequently the part of the vehicle which collides with adjacent obstacles. Protection of the boom 7 and hydraulic cylinder 21 is important to ensure that the device remains fully operable and does not become damaged under normal operating conditions.

The gusset plates 8 extend into the pocket of the counterweight 6 in the mounted position. The gussets plates 8 also protect the boom 6 disposed between them. During raising and lowering of the counterweight 6 suspended from the boom 7, the gusset plates 8 protect the boom 7 from accidental contact with the counterweight 6. Since the counterweight 6 hangs suspended from the boom 7 during raising and lowering, even slight spinning of the counterweight 6 or movement of the vehicle could move the counterweight 6 into damaging contact with the boom 7 or hydraulic cylinder 21. The operator seated in the cab at the controls is not in a position to prevent unwanted spinning or jostling of the counterweight 6. The gusset plates 8 therefore enable a single operator to raise and lower the counterweight from the cab without risking damage to the boom 7 or hydraulic cylinder 21.

The extending of the gusset plates 8 into the pocket of the counterweight 6 also guides the counterweight 6 during raising and lowering. The rear end of the gusset plates 8 and lateral side faces engage the inward faces of the counterweight 6 pocket if the counterweight 6 spins or is jostled laterally.

Figure 11:
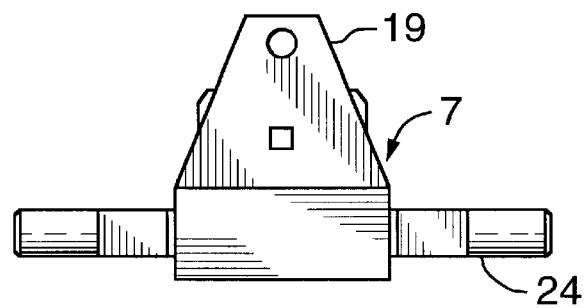
FIG. 11 is a top plan view of the boom.
Figure 9:
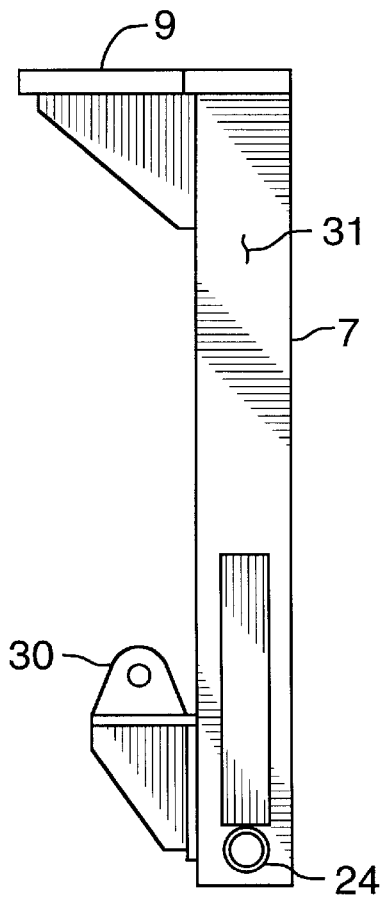
FIG. 9 is a side elevation view of the boom.
Figure 10:
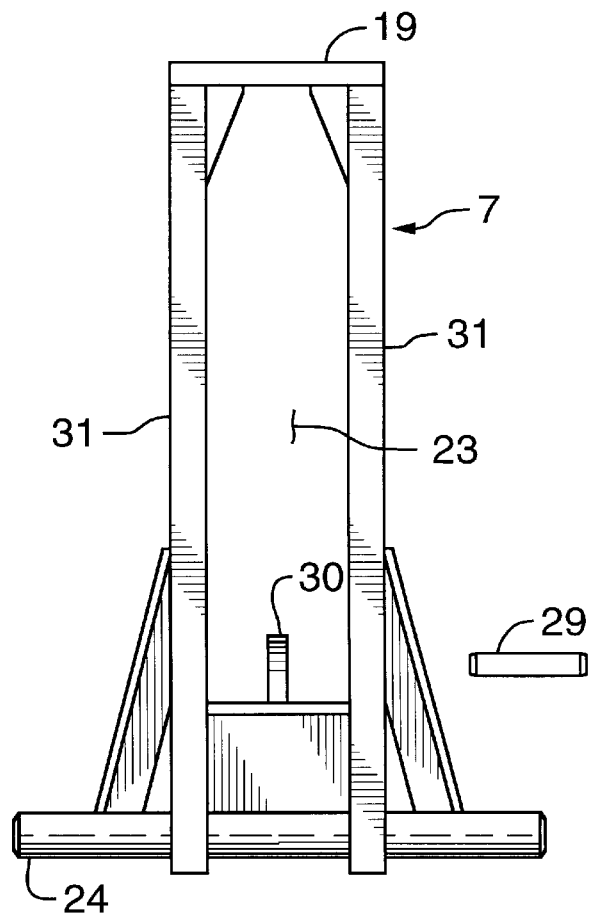
FIG. 10 is a rear elevation view of the boom.

The construction of the boom 7 is best shown in FIGS. 9, 10 and 11. To further facilitate the compact folding of the device, the boom 7 preferably has a central opening 23 through which the hydraulic cylinder 21 extends. The opening 23 also provides a protective enclosure for the hydraulic cylinder 21 in the mounted position shown in FIG. 4. Referring to FIGS. 9, 10 and 11, the boom 7 is mounted to the vehicle frame 1 on a trunnion pin 24. The saddles 9 of FIG. 2 provide means to secure the trunnion 24 with a sliding lock plate 25, lock bolt 26 and nut 27. A grease fitting 28 ensures adequate lubrication is available. The boom 7 includes a link pin 29 rearward of the trunnion 24. The rearward end of the cylinder 21 engages the link pin 29 and secures the cylinder 21 to the link pin support bracket 30 of the boom 7.

Figure 7:
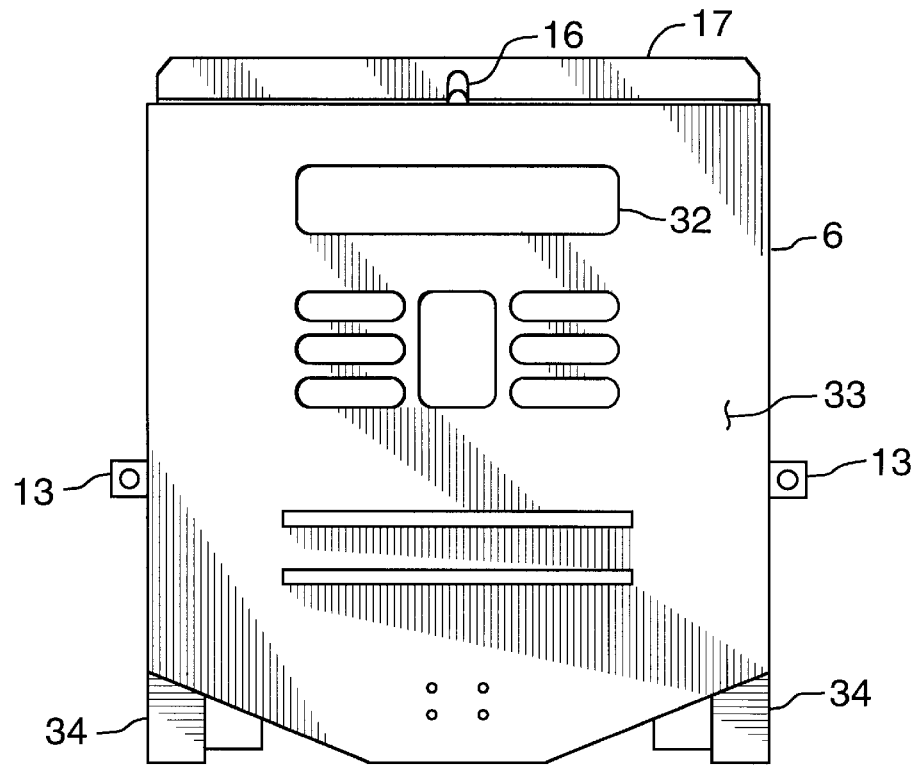
FIG. 7 is a rear elevation view of the counterweight.
Figure 8:
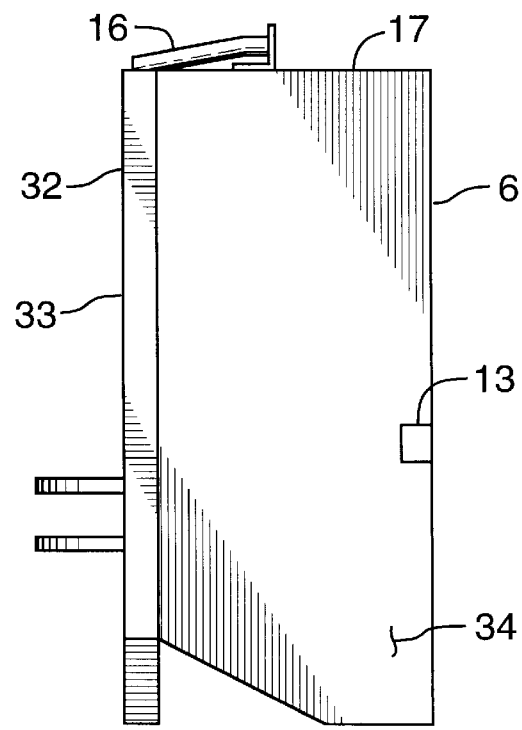
FIG. 8 is a side elevation view of the counterweight.

The boom 7 is preferably constructed with two parallel spaced apart channel section posts 31, a cap plate 19 and a lower link pin support bracket 30 thus defining the central opening 23. The counterweight 6 may be simply fabricated as a weldment of plates as shown in FIGS. 7 and 8. Openings 32 in the rear plate 33 provide air circulation to the vehicle's radiator. Side plates 34 together with rear plate 33 form a U-shaped counterweight 6 which encloses the boom 7.

With reference to FIGS. 4, 5 and 6, the details of the operation will be explained. FIG. 4 shows in sectional view, the compact folding of the hydraulic cylinder 21 within the central opening 23 of the boom 7, and the housing of the boom 7 in the pocket of the counterweight 6, in the mounted position. The eyelet bolt 14 and shackle 15 preferably remain engaged on the rod 16 of the counterweight 6 in the mounted position to be ready for lowering the counterweight 6. It will be understood however that the weight of the counterweight in the mounted position is born by the blocks 13 and bolts 10, as indicated in FIG. 1. The rearward end of the gusset plates 8 engage the forward face of the counterweight's rear plate 33 to provide further stability.

After the bolts 10 have been removed, the counterweight is suspended from the shackle 15 and eyelet bolt 14. As shown in FIG. 5, the counterweight 6 is gradually lowered by activating the hydraulic cylinder 21. The operator is comfortably seated in an enclosed cab able to access all controls including control valves (not shown) for the operation of the boom 7 and hydraulic cylinder 21. In general the maximum hydraulic pressure of the vehicle's hyralic system is 2000 psi, and is more than sufficient to operate the boom 7.

The boom 7 and cylinder 21 operate in a scissor-like fashion as the boom 7 rotates about the trunnion 24 and the cylinder 21 pivots in the upper bracket 22. The gusset plates 8 engage the inner faces of the counterweight's side plates 34 to guide the counterweight 6 and protect the boom 7 from damage.

FIG. 6 shows the counterweight 6 resting on the ground surface 35 in the lowered position. The clevis bolt 18 of the shackle 15 is removed to release the counterweight 6 from the boom 7. The cylinder 21 is actuated to withdraw the boom 7. The forklift vehicle itself or other lifting device can be used to move the counterweight 6 for shipping in the airplane. It will be understood that various other means could be used to connect the boom 7 and counterweight 6 such as chains or cable hoists etc.

To remount the counterweight 6 the above described process is merely reversed. Although the above description and accompanying drawings relate to specific preferred embodiments as presently contemplated by the inventor, it will be understood that the invention in its broad aspect includes mechanical and functional equivalents of the elements described and illustrated.

We claim:

1. A self-mounting counterweight device, for a vehicle having an elongate chassis frame with longitudinal axis, and vehicle powering means, the device comprising:

a hollow U-shaped counterweight, having two vertical side walls and an outward wall defining an internal enclosure, the counterweight including counterweight suspension means and mounting means for releasably mounting the counterweight to the chassis frame;

a boom, having an inward end journalled to the frame and an outward end with tackle means for releasably connecting the boom outward end to the counterweight suspension means; and lift means, having an inward end journalled to the frame and an outward end pivotally connected to the boom a distance from the boom inward end, for selectively raising and lowering the counterweight between: a lowered position, wherein the boom and counterweight are extended outwardly; and a mounted position, wherein the boom and lift means are housed within the internal enclosure of the U-shaped counterweight axially bounded by the vehicle frame and counterweight rear wall, and laterally bounded by the counterweight side walls.

2. A self-mounting counterweight device according to claim 1 including two gussets extending outwardly from the frame and housed within the internal enclosure of the counterweight in the mounted position, the boom and lift means being disposed between the gussets.

3. A device according to claim 1 wherein the lift means comprise an hydraulic cylinder.

4. A device according to claim 3 wherein the boom is mounted to the frame on a trunnion, the boom includes a link pin rearward of the trunnion and a central opening through which the hydraulic cylinder extends, the rearward end of the cylinder engaging the link pin.

5. A device according to claim 4 wherein the boom comprises two parallel spaced apart posts, a cap plate and a lower link pin support bracket, thus defining said central opening.

6. A device according to claim 3 wherein cylinder is powered by the powering means of the vehicle.

7. A device according to claim 1 wherein the tackle means include a releasable shackle.

8. A device according to claim 7 wherein the tackle means include an eyelet bolt suspended from the boom.

9. A device according to claim 8 wherein the tackle means include a rod extending from the counterweight through the shackle.

\* \* \* \* \*